(12) United States Patent
Hasegawa

(10) Patent No.: US 11,057,843 B2
(45) Date of Patent: Jul. 6, 2021

(54) COMMUNICATION CONTROL METHOD, COMMUNICATION CONTROL DEVICE, AND COMMUNICATION CONTROL PROGRAM

(71) Applicant: NEC Corporation, Tokyo (JP)

(72) Inventor: Yohei Hasegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/648,339

(22) PCT Filed: Jul. 11, 2018

(86) PCT No.: PCT/JP2018/026155
§ 371 (c)(1),
(2) Date: Mar. 18, 2020

(87) PCT Pub. No.: WO2019/058715
PCT Pub. Date: Mar. 28, 2019

(65) Prior Publication Data
US 2020/0221389 A1  Jul. 9, 2020

(30) Foreign Application Priority Data
Sep. 21, 2017 (JP) ............................. JP2017-180925

(51) Int. Cl.
*H04W 52/24* (2009.01)
*H04W 52/14* (2009.01)
(Continued)

(52) U.S. Cl.
CPC ......... *H04W 52/245* (2013.01); *H04W 40/08* (2013.01); *H04W 52/146* (2013.01); *H04W 52/367* (2013.01)

(58) Field of Classification Search
CPC ... H04W 40/08; H04W 40/16; H04W 52/146; H04W 52/18; H04W 52/245; H04W 52/367; H04W 52/46
(Continued)

(56) References Cited

U.S. PATENT DOCUMENTS 9,667,983 B2 * 5/2017 Matsubara ............. H04N 19/91
2005/0141545 A1 * 6/2005 Fein ..................... H04B 7/0617
370/445

(Continued)

FOREIGN PATENT DOCUMENTS

| JP | 2009-231912 A | 10/2009 |
|---|---|---|
| JP | 2016-139912 A | 8/2016 |
| WO | 2007/100048 A1 | 9/2007 |

OTHER PUBLICATIONS

International Search Report for PCT Application No. PCT/JP2018/026155, dated Sep. 25, 2018.
(Continued)

*Primary Examiner* — Tan H Trinh

(57) ABSTRACT

A communication control device 30 that determines second communication processing that is communication processing that can be executed in parallel with first communication processing that is communication processing that is executed between a transmission terminal and a reception terminal. The communication control device including: a transmission power determination unit 31 that determines conditions for the transmission power of a signal that would not impede the first communication processing, even if a signal that is transmitted by means of the second communication processing is received by the reception terminal; and a destination determination unit 32 that determines a destination for the second communication processing from among terminals at which a signal that is transmitted at
(Continued)

transmission power that satisfies the determined conditions could arrive.

20 Claims, 10 Drawing Sheets

(51) Int. Cl.
*H04W 52/36* (2009.01)
*H04W 40/08* (2009.01)

(58) Field of Classification Search
USPC ...... 455/7, 69, 522, 501, 509; 370/252, 254, 370/329, 318
See application file for complete search history.

(56) References Cited

U.S. PATENT DOCUMENTS

| | | | | |
|---|---|---|---|---|
| 2007/0002765 | A1* | 1/2007 | Kadaba | H04L 47/823 370/254 |
| 2008/0056177 | A1* | 3/2008 | Mori | H04W 52/04 370/318 |
| 2009/0034647 | A1 | 2/2009 | Shirakata et al. | |
| 2009/0111506 | A1* | 4/2009 | Laroia | H04W 52/18 455/550.1 |
| 2011/0124356 | A1* | 5/2011 | Feng | H04L 43/0811 455/501 |
| 2012/0329503 | A1* | 12/2012 | Jongren | H04W 52/244 455/509 |
| 2013/0051261 | A1* | 2/2013 | Kazmi | H04W 52/0277 370/252 |
| 2014/0179363 | A1* | 6/2014 | Nishikawa | H04L 27/2614 455/522 |
| 2014/0323037 | A1* | 10/2014 | Murakami | H04W 52/38 455/7 |
| 2015/0282043 | A1* | 10/2015 | Fang | H04W 52/241 370/329 |
| 2016/0073355 | A1* | 3/2016 | Yamauchi | H04B 17/27 370/329 |
| 2016/0157182 | A1* | 6/2016 | Izawa | H04W 52/143 455/522 |
| 2016/0219491 | A1* | 7/2016 | Sakurai | H04W 40/22 |
| 2017/0188202 | A1* | 6/2017 | Cariou | H04B 7/0408 |
| 2017/0353932 | A1* | 12/2017 | Sorrentino | H04W 52/383 |
| 2018/0114176 | A1* | 4/2018 | Noda | G06Q 10/0635 |
| 2019/0045542 | A1* | 2/2019 | Yang | H04B 17/318 |
| 2019/0052375 | A1* | 2/2019 | Kalhan | H04L 5/0057 |
| 2019/0052436 | A1* | 2/2019 | Desai | H04L 5/0055 |
| 2019/0238212 | A1* | 8/2019 | Kalhan | H04B 7/15528 |
| 2020/0221389 | A1* | 7/2020 | Hasegawa | H04W 52/46 |

OTHER PUBLICATIONS

"Cisco Wireless LAN Controller", [online], Cisco, [search on Jul. 27, 2017], internet: <http://www.cisco.com/c/ja_p/products/collateral/wireless/4100-series-wireless-lan-controllers/product_data_sheet0900aecd802570b0.html>.

* cited by examiner

⊚ : ACCESS POINT 902

COMMUNICATION CONTROL METHOD, COMMUNICATION CONTROL DEVICE, AND COMMUNICATION CONTROL PROGRAM

This application is a National Stage Entry of PCT/JP2018/026155 filed on Jul. 11, 2018, which claims priority from Japanese Patent Application 2017-180925 filed on Sep. 21, 2017, the contents of all of which are incorporated herein by reference, in their entirety.

TECHNICAL FIELD

The present invention relates to a communication control method, a communication control device and a communication control program, and more particularly relates to a communication control method, a communication control device and a communication control program which enable adjustment of transmission power in wireless communication.

BACKGROUND ART

Together with the proliferation of digital technology in various industries, there has been an increase in approaches for improving productivity in industry by collecting various sensor information such as vibration, temperature, humidity, and the like. In manufacturing processes and so forth in particular, operation management is made efficient by collecting information of some devices such as advanced communication equipment and the like. As digital technology has become widespread, performing operation management in which information of larger numbers of devices is collected has been studied.

Furthermore, the use of wireless communication has also become widespread in various industries. Wireless communication using the Wi-Fi (registered trademark) standard (IEEE (registered trademark) 802.11) in particular does not require a license for use and is therefore used in many industries.

Note that, where wireless communications according to the Wi-Fi standard are concerned, it is thought that the use of wireless communications with a long communication range for which the low-power wide-area (LPWA) communication standard is adopted, such as LoRa (registered trademark), SIGFOX (registered trademark), or Wi-SUN (registered trademark) will become popularized going forward.

If a multiplicity of sensors are making shared use of wireless communication resources, wireless communication signals are likely to collide when the multiplicity of sensors execute wireless communication simultaneously. When a collision between wireless communication signals occurs, there is a problem in that communication efficiency is then low. The foregoing problem is known as the hidden node problem and the exposed node problem.

Furthermore, sensors often transmit short data or frames that include sensor information. In other words, because sensor information transmission is performed frequently, if a sensor executes wireless communication using a scheme that requires multiple procedures to execute the communication, such as a distributed coordination function (DCF) scheme, there is a problem in that communication efficiency is then low.

In wireless communication for which a general DCF scheme is adopted, the ability of a communication terminal (hereinafter also called simply a terminal) to communicate with all the other terminals in the communication area is a precondition for the execution of communication. At least an access point is capable of communicating with all the other terminals in the communication area.

For example, in Wi-Fi standard wireless communication, the access point uses a clear to send (CTS) signal (hereinafter called simply CTS) to advertise, within the communication area, the terminal which is to transmit a signal to the access point next. Note that advertising is processing that corresponds to broadcast communication.

As a result of advertising using a CTS being performed, only one terminal in the communication area transmits a signal to the access point. In other words, there is only one terminal capable of executing valid communication within the communication area.

FIG. 11 is an explanatory diagram showing an example of a signal range in wireless communication for which a general DCF scheme is adopted. The double circle shown in FIG. 11 represents an access point 902. Furthermore, the white circles shown in FIG. 11 represent terminals which are capable of communicating with the access point 902. In addition, the black circle shown in FIG. 11 represents a terminal which is currently communicating with the access point 902. In other words, FIG. 11 shows a plurality of terminals which lie within a predetermined communication area.

Further, the lines linking each of the terminals to the access point 902 shown in FIG. 11 represent communication from each terminal in the communication area to the access point 902 (more specifically, an aspect in which a signal is transmitted during communication). That is, a large number of communication signals are concentrated at the access point 902. In addition, an arrow from the terminal 901 toward the access point 902 shown in FIG. 11 represents a communication signal from the terminal 901 to the access point 902.

The two dashed-line circles shown in FIG. 11 represent a range 9001 and a range 9002, respectively, for transmitted signals of a terminal 901, which is one terminal among the plurality of terminals. The range 9001 and range 9002 are communication areas within which the terminal 901 is capable of communicating.

The range 9001 and range 9002 are examples of transmitted signal ranges when terminal 901 transmits a signal to the access point 902. Note that the meanings of each of the notations shown in FIG. 11 are also the same in the other drawings.

The range 9001 is a range in a case where terminal 901 transmits a signal using a transmission power that enables the signal to reach all the terminals in the communication area which are capable of communicating with the access point 902. If terminal 901 transmits a signal at the foregoing transmission power, all the terminals in the communication area are capable of detecting that terminal 901 is transmitting a signal by performing carrier sensing (checking whether a channel is free). Hence, the other terminals are capable of preventing a collision between transmitted signals from occurring by avoiding signal transmission while transmission processing is being executed by terminal 901.

Furthermore, the range 9002 is the range in a case where terminal 901 has transmitted a signal using the minimum transmission power enabling the signal to reach the access point 902. In other words, the range of the transmitted signal of terminal 901 is larger than the range 9002 and smaller than the range 9001.

If terminal 901 transmits a signal with the foregoing transmission power, the terminals not included in the range 9002 of the transmitted signal from the terminal 901 lie within the communication area. The terminals not included in the range 9002 are not capable of detecting that the terminal 901 is transmitting a signal.

In other words, the terminals not included in the range 9002 are likely to transmit a signal to the access point 902 while transmission processing by terminal 901 is being executed. When a signal is transmitted, there is a risk of a collision between transmitted signals occurring.

Even in a case where a terminal does not adjust the transmission power, in a DCF scheme, the access point 902 transmits, to all the terminals in its own communication area, a CTS indicating that any of the terminals in the communication area is transmitting a signal. As mentioned earlier, when a CTS indicating that terminal 901 is transmitting a signal is transmitted, for example, transmission processing by terminals in the communication area other than terminal 901 is suppressed.

Therefore, mitigating the effect between a plurality of adjacent access points has been examined in order that a large number of wireless communication devices efficiently execute wireless communication using a DCF scheme in which communication is exclusively controlled.

For example, a scheme for adjusting the outputs of respective access points by considering radio interference between access points has been adopted for a Cisco (registered trademark) wireless LAN controller developed by Cisco Systems, Inc., which is described in Non Patent Literature (NPL) 1.

Furthermore, in order that a large number of wireless communication devices execute wireless communication efficiently, wireless adhoc communication and wireless mesh networks, and the like, have been researched. Wireless adhoc communication and wireless mesh networks are mainly communication technology for selecting the shortest path from among communication paths for which an adequate signal strength is obtained.

However, the foregoing communication technology does not provide a function for controlling the transmission timing of the signals of wireless communication devices. Moreover, if the foregoing communication technology is employed and a communication path is selected, the selected communication path is shared by all the wireless communication devices. Unless the positions of wireless communication devices change, the communication path shared by the wireless communication devices is fixed.

CITATION LIST

Non Patent Literature

NPL 1: "Cisco Wireless LAN Controller", [online], Cisco, [search on Jul. 27, 2017], internet: <http://www.cisco.com/c/ja_jp/products/collateral/wireless/4100-series-wireless-lan-controllers/product_data_sheet0900aecd802570b0.html>

SUMMARY OF INVENTION

Technical Problem

A first problem with wireless communications for which the DCF scheme is adopted is that the usage efficiency of wireless radio waves is low because of the regulation that enables only one set of terminals to execute wireless communication in the wireless communication area.

Even if regulation were such that two or more sets of terminals are capable of executing wireless communication, the respective terminals are unable to ascertain a transmission power and a destination in wireless communication where there is a sufficiently small effect on the wireless communication already being executed in the wireless communication area. Hence, the other terminals are unable to execute wireless communication in parallel in areas overlapping a communication area where communication of a sustained fixed quality is being executed, as per a DCF scheme.

Even if a transmission power and a destination in wireless communication which have a sufficiently small effect on wireless communication could be ascertained, the respective terminals would be unable to ascertain signal strength upon receipt of the signal by the receiving side in the wireless communication already being executed in the wireless communication area. The other terminals are therefore unable to execute wireless communication in parallel because it is not possible to determine a transmission power and a destination in wireless communication where there is a sufficiently small effect on the receiving side in the wireless communication already being executed.

The communication technology such as the product which is described in NPL 1 and wireless adhoc communication is intended to execute efficient wireless communication. However, this communication technology is not intended to execute wireless communication in parallel or to maximize the sum total of the amount of communication in a space where wireless communication is being executed.

[Purpose of Invention]

Therefore, the purpose of the present invention is to provide a communication control method, a communication control device, and a communication control program which resolve the foregoing problems and enable wireless communication to be executed in parallel without disrupting wireless communication during the execution in a wireless communication area of wireless communication already being executed.

Solution to Problem

The communication control method of the present invention is a communication control method executed in a communication control device that determines second communication processing that is communication processing that can be executed in parallel with first communication processing that is communication processing that is executed between a transmission terminal and a reception terminal, the communication control method including: determining conditions for the transmission power of a signal that would not impede the first communication processing, even if a signal that is transmitted by means of the second communication processing is received by the reception terminal; and determining a destination for the second communication processing from among terminals at which a signal that is transmitted at transmission power that satisfies the determined conditions could arrive.

The communication control device of the present invention is a communication control device that determines second communication processing that is communication processing that can be executed in parallel with first communication processing that is communication processing that is executed between a transmission terminal and a reception terminal, the communication control device including: a transmission power determination unit which determines conditions for the transmission power of a signal that would not impede the first communication processing, even if a signal that is transmitted by means of the second communication processing is received by the reception terminal; and a destination determination unit which determines a destination for the second communication processing from among terminals at which a signal that is transmitted at transmission power that satisfies the determined conditions could arrive.

A non-transitory computer-readable recording medium on which a communication control program according to the present invention is recorded stores a communication control program including: when executed by a computer that determines second communication processing that is communication processing that can be executed in parallel with first communication processing that is communication processing that is executed between a transmission terminal and a reception terminal, determining conditions for the transmission power of a signal that would not impede the first communication processing, even if a signal that is transmitted by means of the second communication processing is received by the reception terminal; and determining a destination for the second communication processing from among terminals at which a signal that is transmitted at transmission power that satisfies the determined conditions could arrive.

Advantageous Effects of Invention

According to the present invention, wireless communication can be executed in parallel without disrupting wireless communication during the execution in a wireless communication area of wireless communication already being executed.

DESCRIPTION OF EMBODIMENTS

First Exemplary Embodiment

[Description of Configuration]

Figure 1:
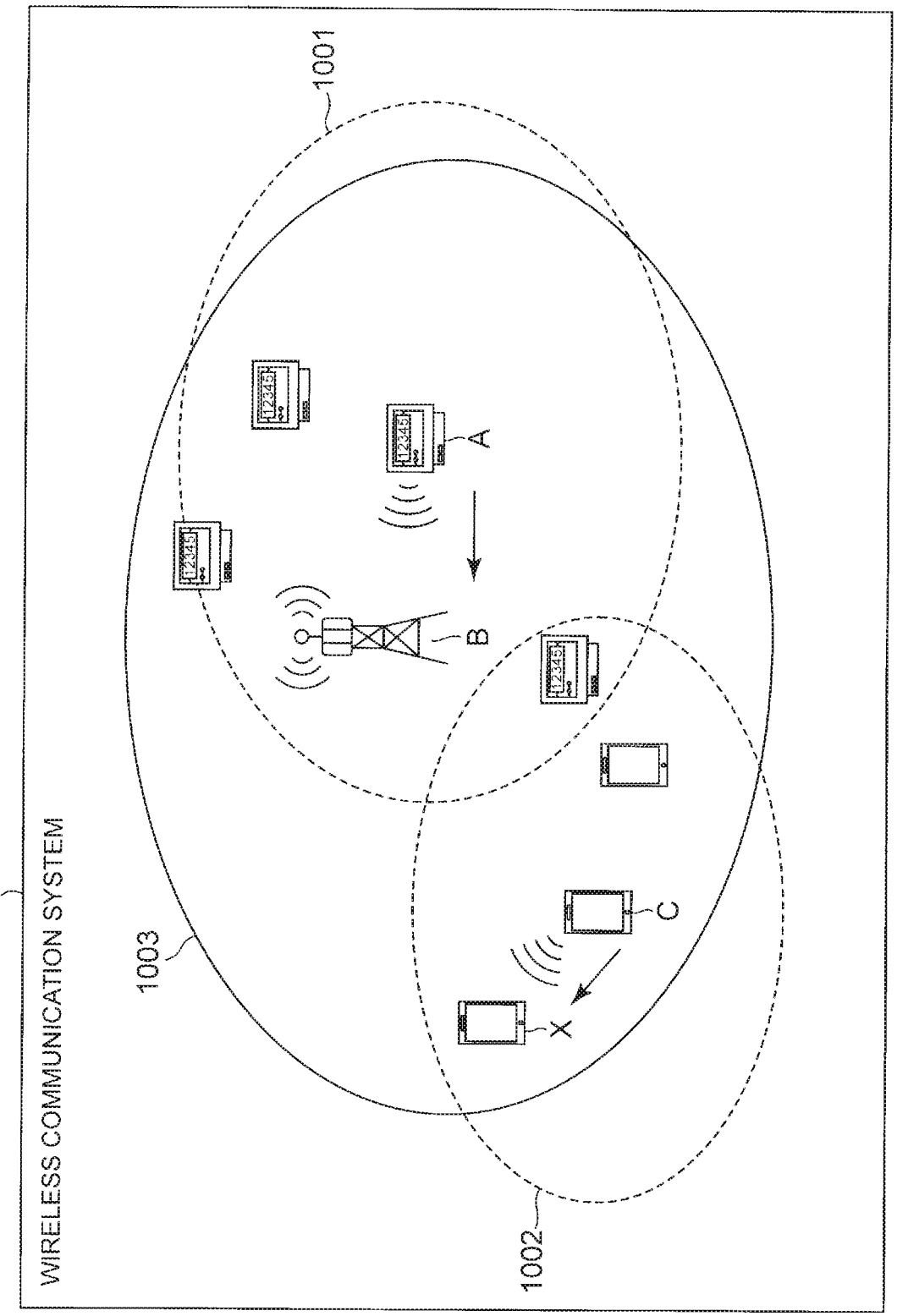
FIG. 1 is an explanatory diagram showing a configuration example of a first exemplary embodiment of a communication system according to the present invention.

An exemplary embodiment of the present invention will be described hereinbelow with reference to the accompanying drawings. FIG. 1 is an explanatory diagram showing a configuration example of a first exemplary embodiment of a communication system according to the present invention.

The terminals included in a wireless communication system 10 according to this exemplary embodiment each determine an autonomously distributed transmission power. Furthermore, in a wireless communication system 10 according to this exemplary embodiment, a radio wave-range space is treated as being divided and wireless communication is executed in parallel in each divided space. In other words, the terminals included in the wireless communication system 10 are each capable of coordinating and controlling communication processing.

As shown in FIG. 1, the wireless communication system 10 according to this exemplary embodiment includes a terminal A, a terminal B, a terminal C, and a terminal X. In the example shown in FIG. 1, terminal A, terminal B, terminal C, and terminal X included in the wireless communication system 10 each execute wireless communication in a predetermined space. Note that terminal C is the terminal according to this exemplary embodiment. Furthermore, terminal A, terminal B, and terminal X are each general wireless communication devices. Note that terminal A, terminal B, or terminal X could also be the terminal according to this exemplary embodiment.

Terminal A is a sensor device, for example. Terminal B is a gateway, for example. Further, terminal B has an access point function. In addition, terminals C and X are notebook PCs (personal computers) or smartphones, for example. In this exemplary embodiment, an access point is handled as one of the terminals serving as a destination for a wireless communication signal.

In the example shown in FIG. 1, terminal A executes wireless communication via the access point, that is, via terminal B. Note that terminal C and terminal X could also execute wireless communication via the access point.

Furthermore, the dashed-line ellipse 1001 shown on the right in FIG. 1 represents the range (hereinafter called range 1001) of a transmitted signal from terminal A. The range 1001 is also a range within which the other terminals are capable of restoring received data on the basis of a received signal when terminal A has transmitted a signal to the other terminals.

Similarly, the dashed-line ellipse 1002 shown on the left in FIG. 1 represents the range (hereinafter called range 1002) of a transmitted signal from terminal C. In addition, the solid-line ellipse 1003 shown in FIG. 1 represents the range (hereinafter called range 1003) of a transmitted signal from terminal B, which is the access point.

According to the DCF scheme, a terminal transmits data when the fact that another terminal is executing communication is not detected while a randomly computed backoff time elapses. Note that backoff is transmission standby processing for avoiding a collision between frames resulting from a plurality of wireless communication devices starting to transmit simultaneously. A backoff algorithm uses random numbers so as to afford a plurality of wireless communication devices an equal opportunity to communicate.

In this exemplary embodiment, executing communication in parallel between terminal C and terminal X in the communication area of terminal B while communication is being executed between terminal A and the access point (terminal B) is considered.

Figure 2:
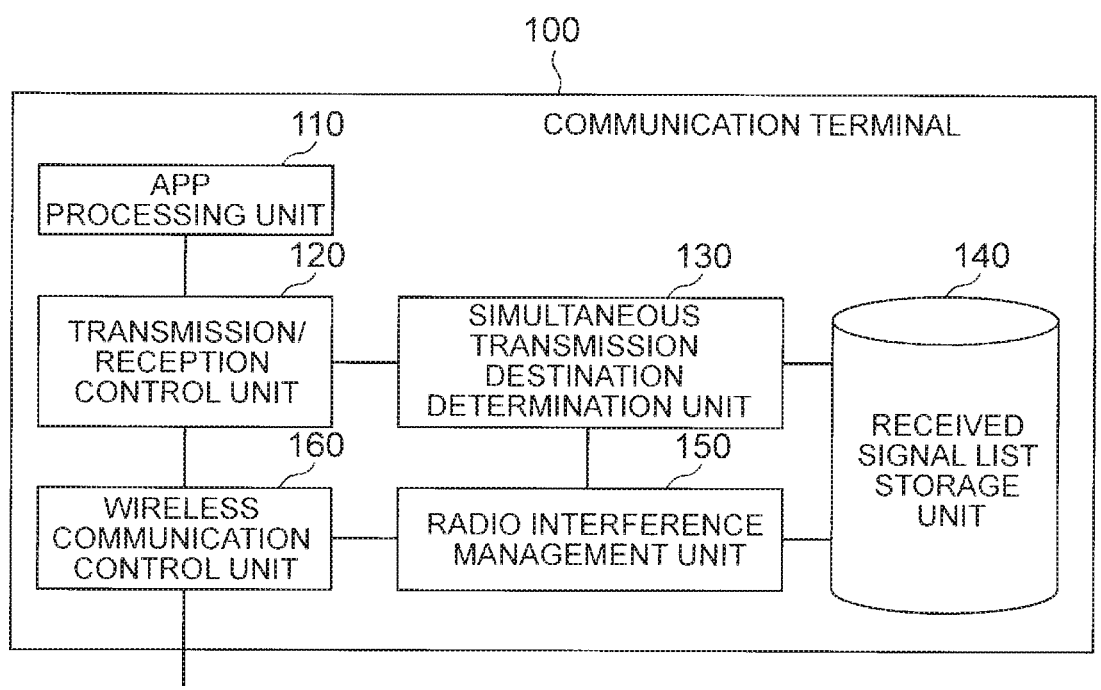
FIG. 2 is a block diagram showing a configuration example of a communication terminal according to the first exemplary embodiment.

FIG. 2 is a block diagram showing a configuration example of a communication terminal according to the first exemplary embodiment. As shown in FIG. 2, a communication terminal 100 includes an application processing unit (hereinafter called an app processing unit) 110, a transmission/reception control unit 120, a simultaneous transmission destination determination unit 130, a received signal list storage unit 140, a radio interference management unit 150, and a wireless communication control unit 160.

As mentioned earlier, the configuration of terminal C shown in FIG. 1 is the same as the configuration of the communication terminal 100 shown in FIG. 2. Furthermore, the respective configurations of terminal A, terminal B, and terminal X shown in FIG. 1 may also be the same as the configuration of the communication terminal 100 shown in FIG. 2.

The app processing unit 110 has a function for determining data to be transmitted, data to be received, or data to be transferred. In addition, the transmission/reception control unit 120 has a function for executing transmission processing on the basis of a destination and a transmission power designated by the simultaneous transmission destination determination unit 130.

Note that the transmission processing according to this exemplary embodiment is another name for the communication processing when the description is dedicated to "transmission". Transmission processing that is executed while another communication processing is being executed will also be referred to hereinbelow as second communication processing. In addition, another communication processing that is already being executed and different from the second communication processing is also called first communication processing.

The transmission/reception control unit 120 frames and then transmits data to be transmitted that has been input from the app processing unit 110. The transmission/reception control unit 120 selects, from a destination list for data awaiting transmission, data that can be transmitted to the designated destination at the designated transmission power within a predetermined communication time. The transmission/reception control unit 120 transmits the selected data to the destination.

The simultaneous transmission destination determination unit 130 has a function for determining, on the basis of information stored in the received signal list storage unit 140, a destination and a transmission power for communication which, even when executed, has a small effect on communication currently being executed.

More specifically, the simultaneous transmission destination determination unit 130 determines the destination and the transmission power for communication which, even when executed, does not disrupt communication currently being executed. Note that the simultaneous transmission destination determination unit 130 may also determine a transmission power condition.

For example, the simultaneous transmission destination determination unit 130 estimates a communication time for communication currently being executed, the signal strength when the access point receives a signal, and SN ratio. The simultaneous transmission destination determination unit 130 determines a transmission power and a destination which have no effect on the access point even when the communication terminal 100 transmits a signal in parallel with communication currently being executed, on the basis of the estimated results and the distance from another terminal which is a transmission target.

The received signal list storage unit 140 has a function for storing, for each transmission source that has transmitted a signal, the signal strength of the received signal received by the communication terminal 100. The received signal list storage unit 140 stores a maximum value, an average value, and a distribution for the signal strength of the received signal, for example. Note that the received signal list storage unit 140 may also store the SN ratio together with the signal strength.

The radio interference management unit 150 has a function for measuring, for each transmission source, the signal strength of the received signal received by the communication terminal 100. The radio interference management unit 150 stores the measured signal strength values in the received signal list storage unit 140.

The wireless communication control unit 160 has a function for executing wireless communication. For example, the wireless communication control unit 160 transfers, via wireless communication, frames that are input from the transmission/reception control unit 120. The wireless communication control unit 160 also has a function for detecting communication that is being executed between terminals.

As described hereinbelow, for example, the simultaneous transmission destination determination unit 130 of terminal C according to this exemplary embodiment determines a destination X to which is transmitted a signal that has a small effect on communication executed between terminal A and terminal B and that is less affected by the communication executed between terminal A and terminal B.

$$C \text{ transmits to a node } \exists X \text{ with power } P \text{ s.t. } P(C,X,B)$$
$$<P(A,B,B), P(C,X,X) > P(A,B,X) \quad \text{Equation (1)}$$

Note that, for example, a signal strength P(N, M, L) represents the signal strength when a signal transmitted from a terminal N to a terminal M is received by a terminal L. The signal strength P(N, M, L) is given by the following equation by using the model of radio attenuation with respect to distance, for example.

$$P(N,M,L)=RSSI(d)=A-10B\log_{10}(d) \quad \text{Equation (2)}$$

Note that d in Equation (2) is a distance between terminal N and terminal L. Furthermore, A is the signal strength of a signal received at a location which is one meter from terminal N. Further, B is a numeric constant. Note that another signal strength model could also be used to estimate the signal strength of a signal that is transmitted in a location which has a large number of obstacles and reflective objects.

Note that the simultaneous transmission destination determination unit 130 of terminal C may estimate a signal strength range when terminal B receives a signal from terminal A, on the basis of a history of a signal strength when terminal B receives a signal from terminal A. In addition, the simultaneous transmission destination determination unit 130 may determine, as the transmission processing destination, a terminal which can be reached by a signal transmitted using a transmission power for which a signal strength is sufficiently less than the estimated signal strength range.

Furthermore, the wireless communication control unit 160 of terminal C may advertise, to other terminals in the communication area, data storing information representing the signal strength, the SN ratio, and the communication time when terminal B receives a frame from terminal A.

[Description of Operation]

Figure 3:
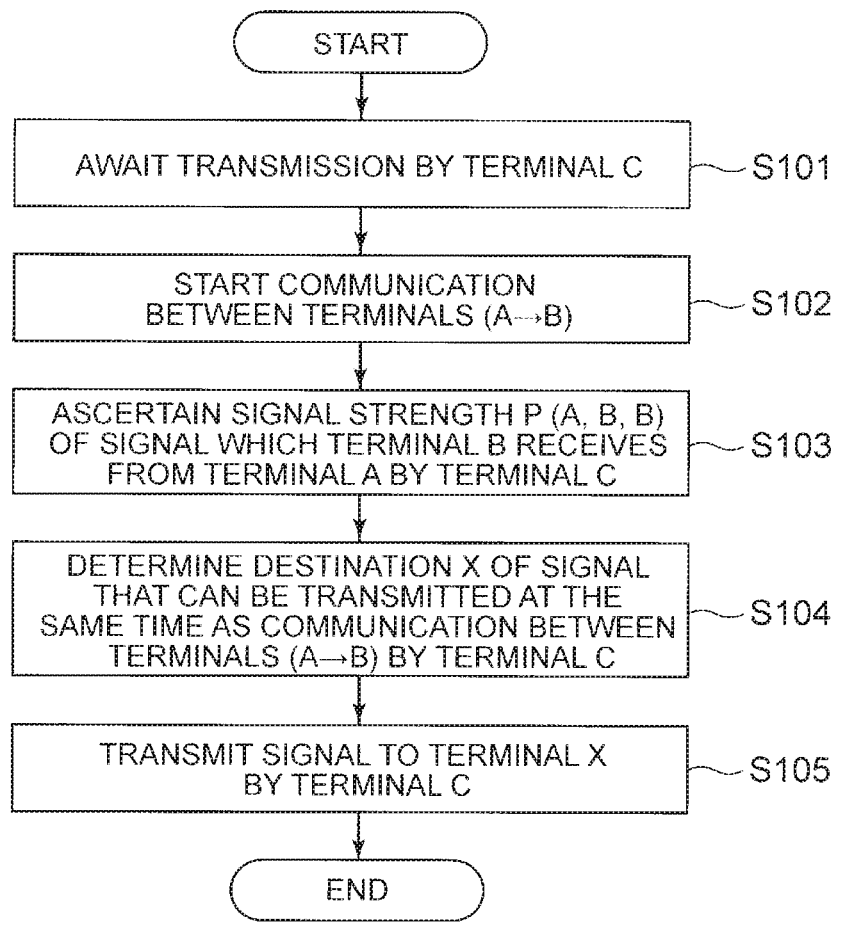
FIG. 3 is a flowchart showing a communication processing operation by a terminal C according to the first exemplary embodiment.

An operation in which terminal C according to this exemplary embodiment executes communication will be described hereinbelow with reference to FIG. 3. FIG. 3 is a flowchart showing a communication processing operation by a terminal C according to the first exemplary embodiment. FIG. 3 shows the operation of terminal C from a time when communication is started until communication ends.

Note that the respective configurations of terminal A, terminal B, terminal C, and terminal X in this example are configurations of the communication terminal 100 shown in FIG. 2.

The status of the wireless communication system 10 before the communication processing shown in FIG. 3 is executed is a status in which several terminals including terminal A and terminal C retain data awaiting transmission and in which carrier sensing is being executed.

The communication processing shown in FIG. 3 is an example of processing in which terminal C detects communication from terminal A to terminal B and transmits data in parallel without affecting the detected communication. Furthermore, the communication processing shown in FIG. 3 is an example of processing in a case where the transmission power and position of each terminal is known information. In other words, in this example, terminal C is capable of computing the signal strength of a received signal on the receiving side when an optional transmitting-side terminal has transmitted a signal to an optional receiving-side terminal.

The wireless communication control unit 160 of terminal C awaits the execution of transmission processing while performing carrier sensing (step S101). More specifically, the wireless communication control unit 160 confirms whether or not another terminal is transmitting a signal by observing communication radio waves.

Terminal A ends the backoff time and starts transmitting a signal to terminal B. That is, communication between terminal A and terminal B is started (step S102). Note that terminal A may transmit, to terminal B, a request to send (RTS) signal (hereinafter called simply RTS) that indicates the transmission power.

In wireless communication for which a general DCF scheme is adopted, terminal C suspends backoff at the moment when terminal A starts a communication and awaits the next transmission opportunity which is when terminal A ends the communication. However, terminal C according to this exemplary embodiment executes backoff continuously even when terminal A starts a communication.

Thereafter, the wireless communication control unit 160 of terminal B advertises a CTS. The signal strength P(A, B, B) when the transmitted signal from terminal A is received is included in the CTS by the radio interference management unit 150.

By receiving the CTS, the simultaneous transmission destination determination unit 130 of terminal C ascertains the signal strength P(A, B, B) when terminal B receives the signal from terminal A (step S103). Note that the simultaneous transmission destination determination unit 130 may estimate the signal strength P(A, B, B) by itself rather than being dependent on the CTS. For example, if ascertaining the position of each terminal, the simultaneous transmission destination determination unit 130 is capable of estimating the signal strength P(A, B, B) on the basis of the distances between the terminals.

Thereafter, the simultaneous transmission destination determination unit 130 of terminal C determines destination X such that a signal strength P(C, X, B) when a signal transmitted from terminal C to terminal X is received by terminal B is sufficiently less than the signal strength P(A, B, B) (step S104).

To determine destination X, the simultaneous transmission destination determination unit 130 of terminal C searches for a destination satisfying a condition from among a set of destinations for data awaiting transmission by considering the transmission power required for the signal to reach the destination, for example. For example, the simultaneous transmission destination determination unit 130 searches for a destination satisfying the condition in order starting with the destination at the head of a transmission standby queue in which destinations for data awaiting transmission are stored in order of priority.

The destination X thus determined is a destination for transmission processing (second communication processing) which enables execution in parallel with communication (first communication processing) being executed between terminal A and terminal B. Note that the simultaneous transmission destination determination unit 130 may determine the transmission destination from among candidates for nodes to be bypassed instead of determining a final destination for data.

Thereafter, if communication other than the communication being executed between terminal A and terminal B has not been detected even though the backoff time has elapsed, the wireless communication control unit 160 of terminal C transmits a signal to terminal X using a transmission power that enables the signal to reach terminal X and has a sufficiently small effect, on the terminal B side, on the communication from terminal A (step S105).

That is, the wireless communication control unit 160 transmits a signal to terminal X using a transmission power such that the signal strength at terminal B is the signal strength P(C, X, B). After transmitting the signal, terminal C ends the communication processing shown in FIG. 3. Terminal X, which has received the signal, transmits a CTS using a transmission power such that the effect on the communication being executed between terminal A and terminal B is sufficiently small.

Figure 4:
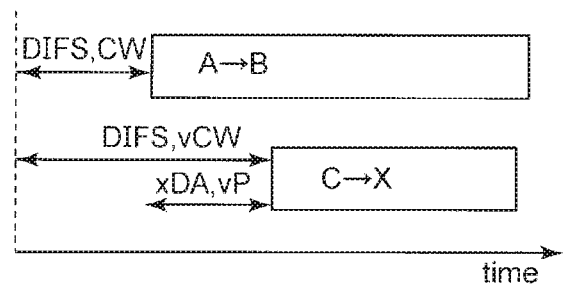
FIG. 4 is an explanatory diagram showing an example of a chronological relationship of communication executed by a wireless communication system 10.

FIG. 4 is an explanatory diagram showing an example of the chronological relationship of communication executed by the wireless communication system 10. The rectangle labeled "A→B" in FIG. 4 represents the communication executed between terminal A and terminal B. Furthermore, the rectangle labeled "C→X" in FIG. 4 represents the communication executed between terminal C and terminal X.

The backoff time in step S102 corresponds to the total time of the DCF inter frame space (DIFS) and the contention windows (CW) which are shown in FIG. 4. As described earlier, the communication executed between terminal A and terminal B is started after the backoff time "DIFS+CW" has elapsed.

In addition, even when the foregoing communication is started, terminal C executes backoff continuously as shown in FIG. 4. vCW shown in FIG. 4 is a virtual contention window which is used in this exemplary embodiment.

Furthermore, xDA shown in FIG. 4 represents destination address search processing. In addition, vP represents processing to determine the transmission power for transmitting a signal. During the backoff time "DIFS+vCW", terminal C ends xDA and vP (step S104).

Next, the communication executed between terminal C and terminal X is started after the backoff time "DIFS+vCW" has elapsed (step S105). When communication is started, terminal C transfers a frame to terminal X.

Note that terminal C is also capable of receiving a first frame of the communication executed between terminal A and terminal B and of estimating a scheduled end time for the communication on the basis of the received first frame. In addition, terminal C may also estimate the scheduled end time of the communication on the basis of the frame length of the frame described in an RTS or a CTS.

By estimating the scheduled end time, terminal C is able to end the communication being executed between terminal C and terminal X no later than the scheduled end time estimated for the communication being executed between terminal A and terminal B. If terminal C ends the communication no later than the estimated scheduled end time, the observable difference from the outside between wireless communication for which a general DCF scheme is adopted and the wireless communication according to this exemplary embodiment is small.

Figure 5:
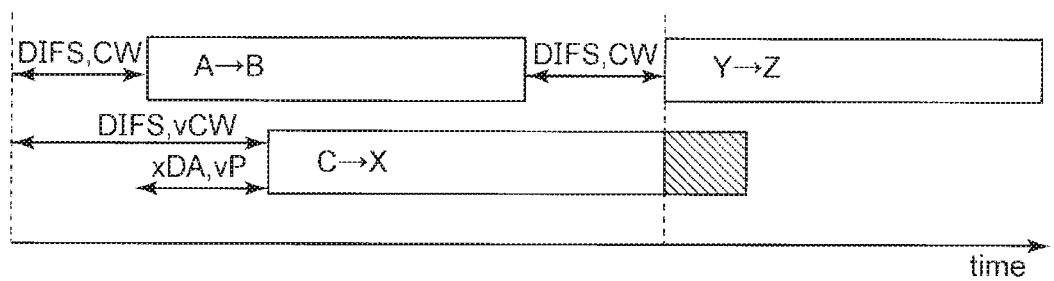
FIG. 5 is an explanatory diagram showing another example of a chronological relationship of communication executed by the wireless communication system 10.

The benefits of terminal C ending the communication no later than the estimated scheduled end time are described hereinbelow. FIG. 5 is an explanatory diagram showing another example of the chronological relationship of communication executed by the wireless communication system 10.

In the example shown in FIG. 5, unlike the example shown in FIG. 4, the communication executed between terminal C and terminal X is also executed after the communication executed between terminal A and terminal B has ended. Furthermore, at the stage where the communication between terminal C and terminal X is being executed, there is a terminal Y in a transmission standby state which is awaiting the end of the communication executed between terminal A and terminal B.

Terminal Y is a terminal which is capable of receiving a transmitted signal from terminal A and incapable of receiving a transmitted signal from terminal C. Thus, terminal Y starts signal transmission without waiting for the end of the communication executed between terminal C and terminal X after the backoff time, which is started after the communication executed between terminal A and terminal B has ended, has elapsed.

When terminal X receives the signal transmitted by terminal Y to a terminal Z, there is the likelihood of a collision between the signals occurring, or the like, and of the communication executed between terminal C and terminal X being affected. The area of the oblique lines shown in FIG. 5 represents the part of the communication which is likely to be affected.

However, it is highly likely that the foregoing problem will not arise as long as terminal C ends the communication no later than the estimated scheduled end time. In order to estimate the scheduled end time for the communication executed between terminal A and terminal B, terminal C refers to the frame length of the frame which is transferred in the communication executed between terminal A and terminal B, for example.

By using the frame length thus referred to, terminal C computes the communication time of the communication executed between terminal A and terminal B, for example, as "communication time=(frame length/communication speed)".

By using the computed communication time, terminal C computes the scheduled end time of the communication executed between terminal A and terminal B as "scheduled end time=(communication start time of communication executed between terminal A and terminal B+computed communication time)", for example.

Note that terminal A may also include the communication time of the communication executed between terminal A and terminal B in an RTS, a CTS or a frame. Terminal C may also end the communication executed between terminal C and terminal X no later than the scheduled end time of the communication executed between terminal A and terminal B computed as indicated above, on the basis of the communication time included in the received information.

In the wireless communication system 10 according to this exemplary embodiment, even when communication is started by a terminal other than terminal A, a larger amount of communication is executed in parallel by repeatedly executing the processing of steps S103 to S105.

In the example shown in FIG. 3, another terminal which has received a CTS is capable of transmitting a signal using a transmission power that has a small effect on terminal B, which is terminal on the receiving side of existing communication, and terminal X by cumulatively taking into account another CTS already received.

Figure 6:
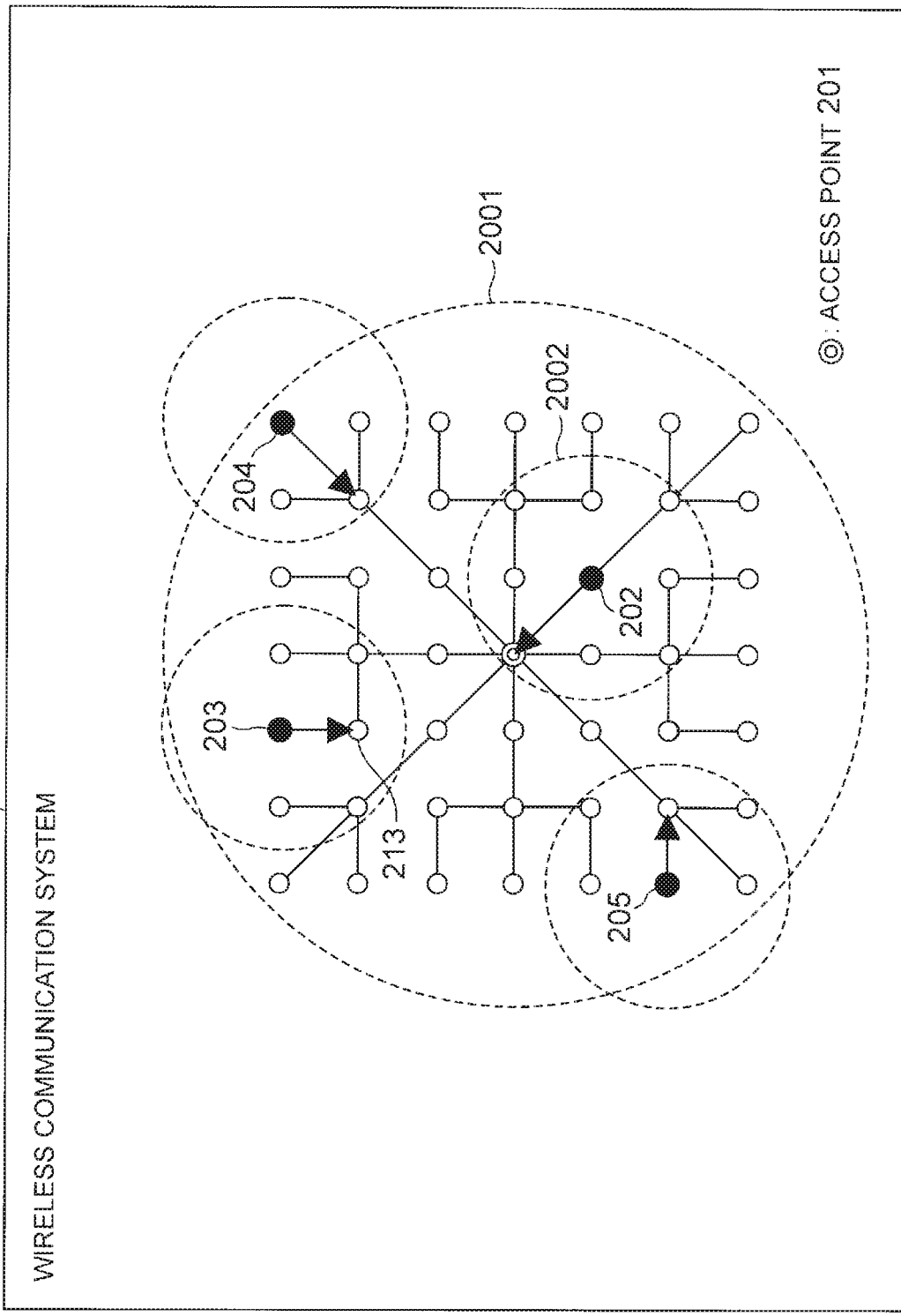
FIG. 6 is an explanatory diagram showing an example of communication executed by a wireless communication system 20.

Another example of the communication of the wireless communication system according to this exemplary embodiment is shown hereinbelow. FIG. 6 is an explanatory diagram showing an example of communication executed by a wireless communication system 20.

As shown in FIG. 6, the wireless communication system 20 includes an access point 201 at the center of a communication area. In addition, as indicated earlier, the dashed-line circles shown in FIG. 6 and in the center of which the respective terminals are located represent the range for radio waves transmitted in wireless communication.

For example, a range 2001 is a range for radio waves transmitted by the access point 201. In addition, a range 2002 is a range for radio waves transmitted by a terminal 202.

In this example, if terminal 202 has transmitted a signal to the access point 201, a terminal 203, a terminal 204, and a terminal 205 execute transmission processing in that order after the transmission processing of terminal 202. Note that the respective transmission processing is executed in parallel.

In the example shown in FIG. 6, transmission processing is executed as detailed hereinbelow. Terminal 202, which has ended backoff, transmits an RTS to the access point 201. The access point 201, which receives the RTS, transmits a CTS to all the terminals in the range 2001 within the communication area.

Note that the CTS transmitted by the access point 201 stores information indicating the signal strength upon receipt of the signal from terminal 202 and that the transmission source of the signal is terminal 202. Note that the access point 201 may also store the foregoing information in a frame other than a CTS.

Terminal 202 estimates the attenuation amount of the signal on the basis of the difference from the transmission power of terminal 202 by referring to the signal strength indicated by the received CTS. Thereafter, terminal 202 computes the transmission power such that the signal strength of the signal reaching the access point 201 is higher than the lowest receiver sensitivity of the access point 201.

Terminal 202 then transmits a signal to the access point 201 at the computed transmission power. Note that terminal 202 stores the computed transmission power for the access point 201. Further, terminal 202 may compute the respective transmission power for all the terminals in advance and store the computed respective transmission power.

The terminals, other than terminal 202, which lie within the range 2001 in the communication area and have received the CTS each execute backoff continuously. The respective terminals that continuously execute backoff store the transmission power which enables a signal to reach the access point 201 and several other terminals and which has been obtained in a previous CTS transfer.

On the basis of the stored transmission power, the terminals each select a destination for which the transmission power is sufficiently less than the transmission power for the access point 201, from among the destinations for each frame which are stored in the transmission queue. For example, terminal 203 selects a terminal 213 which is a destination to which a signal may be transmitted using a transmission power 20 dB lower than the transmission power for the access point 201.

More specifically, the terminals each select a transmission power such that the signal strength upon receipt by the access point 201 is less than the signal strength indicated by the CTS. Furthermore, the terminals each select a destination which can be reached by a signal using the selected transmission power.

A terminal that has ended backoff transmits a signal using the transmission power selected for the selected destination. Terminal 213 on the receiving side of terminal 203 transmits a CTS using a transmission power that does not affect the access point 201, which is the object of transmission processing being executed that has already been detected. A plurality of transmission processing is executed recursively by repeatedly executing the foregoing processing.

Figure 7:
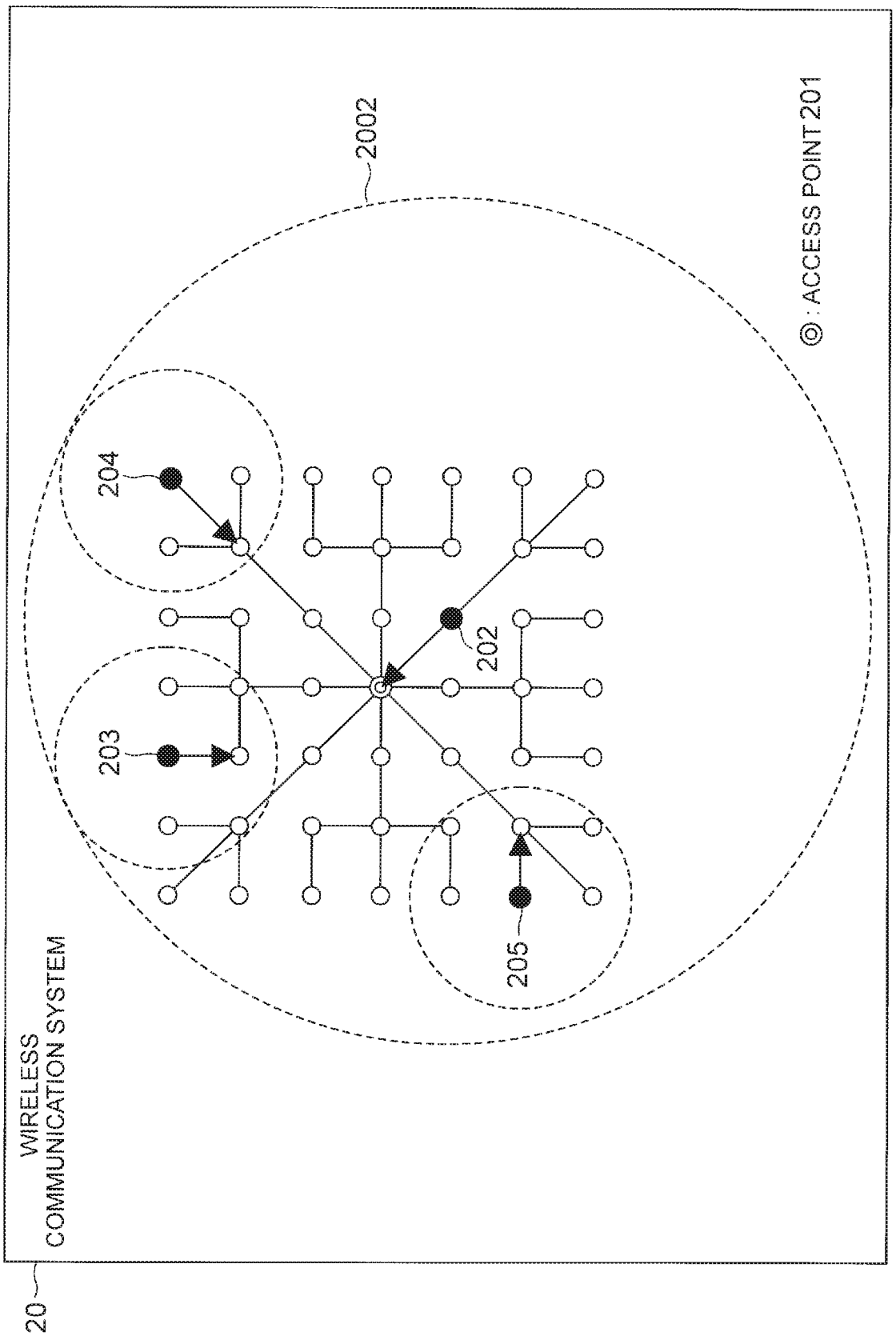
FIG. 7 is an explanatory diagram showing another example of communication executed by the wireless communication system 20.

FIG. 7 is an explanatory diagram showing another example of communication executed by the wireless communication system 20. FIG. 7 shows an example of a case where terminal 202 transmits a signal using a transmission power that enables the signal to reach all the terminals within the communication area. The range 2002 shown in FIG. 7 is larger than the range 2002 shown in FIG. 6.

Note that terminal 202 shown in FIG. 7 may not be a communication terminal with the configuration shown in FIG. 2. For example, terminal 202 may be a general communication terminal for which the DCF scheme is adopted. In other words, the example shown in FIG. 7 is an example where usage of the communication terminal 100 according to this exemplary embodiment is combined with a general communication terminal that covers the communication area.

In the example shown in FIG. 7, transmission processing is executed as detailed hereinbelow. Terminal 202, which has ended backoff, starts transmission processing. Terminal 203 according to this exemplary embodiment detects the destination and transmission power of the transmission processing by terminal 202.

Next, terminal 203 estimates the signal strength when the access point 201 has received a signal from terminal 202. Terminal 203 is able to roughly estimate the position where terminal 202 is located as long as the range of the transmission power of terminal 202 can be ascertained.

Figure 8:
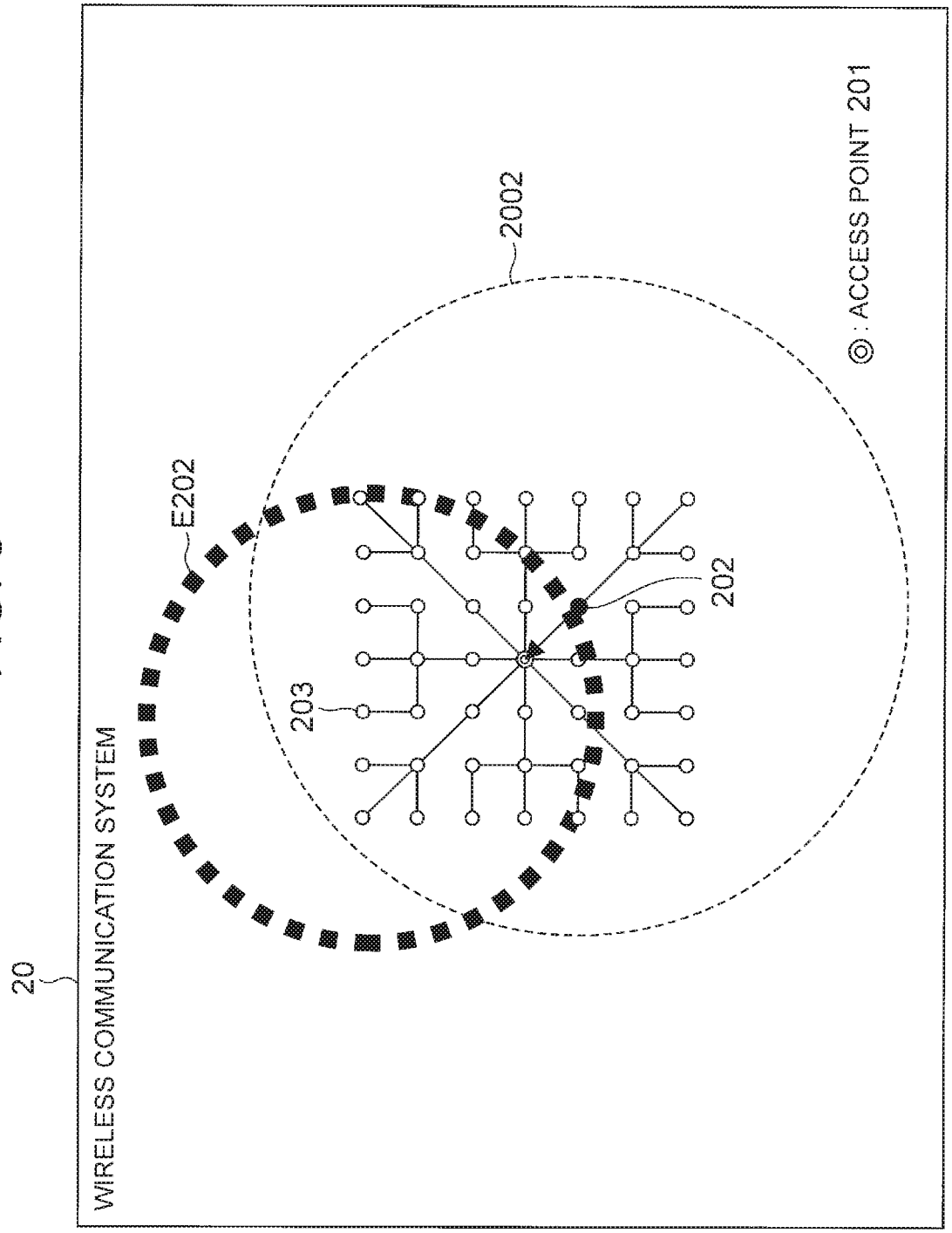
FIG. 8 is an explanatory diagram showing an example of estimation, by a terminal 203, of the position of a transmission terminal.

FIG. 8 is an explanatory diagram showing an example of estimation, by a terminal 203, of the position of a transmission terminal. For example, in FIG. 8, a thick dashed-line circle denotes a range E202 which terminal 203 estimates terminal 202 is highly likely to be located in.

By estimating the E202, terminal 203 is also capable of estimating the distance from terminal 202 to the access point 201, the signal attenuation amount, and the signal strength range upon receipt of the signal by the access point 201.

Using the foregoing method, the terminals that have received an RTS or an optional transmitted signal from terminal 202 each estimate the signal strength upon receipt of the signal by the access point 201. Next, the terminals each transmit a signal using a transmission power that has a signal strength upon receipt by the access point 201 which is less than the estimated signal strength and enables the signal to reach the destination terminal.

Note that, by measuring the approximate position of terminal 202 in advance, terminal 203 is able to narrow the estimated range of the signal strength upon receipt of the signal by the access point 201. In other words, the signal-strength estimation accuracy is improved.

In addition, when two ranges like E202 in which terminal 202 is highly likely to be located are estimated, terminal 202 is estimated to be located at the point where the two areas overlap. Furthermore, when three ranges in which terminal 202 is highly likely to be located are estimated, the point where terminal 202 is located is narrowed to a single point. In this example, communication is executed in parallel even when a CTS is not used.

Figure 9:
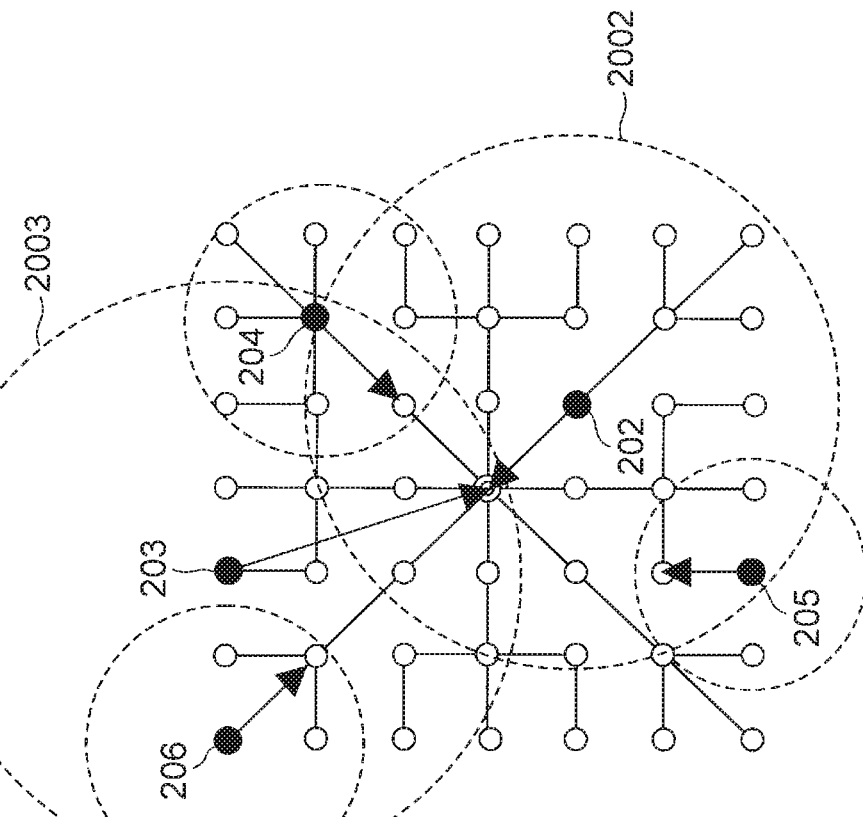
FIG. 9 is an explanatory diagram showing another example of communication executed by the wireless communication system 20.

FIG. 9 is an explanatory diagram showing another example of communication executed by the wireless communication system 20. FIG. 9 shows an example of a case where terminal 202 transmits a signal using a transmission power at which the signal is unable to reach some of the terminals within the communication area. The range 2002 shown in FIG. 9 is smaller than the range 2002 shown in FIG. 7.

FIG. 9 shows an example of communication which is executed in parallel even when colliding communication signals exist. The range 2003 shown in FIG. 9 is the range of radio waves transmitted by terminal 203.

In the example shown in FIG. 9, a terminal exists which is unable to detect signal transmission by terminal 202 when a CTS is not used. For example, terminal 203, which is not included in the range 2002, will likely cause a transmitted signal to collide with a transmitted signal from terminal 202.

However, communication is executed in parallel in a partial area within the communication area even when a CTS is not used. For example, terminal 204 and terminal 205, which detect signal transmission by terminal 202, are capable of transmitting a signal using a transmission power that does not affect the signal strength at the access point 201. Further, a terminal 206, which detects signal transmission by terminal 203, is capable of transmitting a signal using a transmission power that does not affect the signal strength at the access point 201.

In other words, terminal 204 and terminal 205, which detect signal transmission by terminal 202, and terminal 206, which detects signal transmission by terminal 203, are capable of executing data transfer in parallel. In this example, although it is likely that a transmitted signal from terminal 202 will collide with a transmitted signal from terminal 203, a plurality of other sets of terminals included in the wireless communication system 20 is capable of executing communication in parallel.

[Description of Advantageous Effects]

The communication terminal 100 according to this exemplary embodiment provides a communication method which considers the effect of wireless communication on other terminals. In the communication terminal 100 according to this exemplary embodiment, the simultaneous transmission destination determination unit 130 determines a destination communication device to which a signal is transmitted in parallel with communication already being executed, and the wireless communication control unit 160 transmits the signal while adjusting the transmission timing. Thus, the communication terminal 100 according to this exemplary embodiment is capable of achieving autonomously distributed parallel communication within a communication area. In other words, the communication capacity in the space increases.

The communication terminal 100 according to this exemplary embodiment determines, in an autonomously distributed manner, a transmission power and a transmitted signal destination for which the effect of radio interference on communication is sufficiently small while other terminals are executing communication. The communication terminals each execute, in parallel, transmission processing to the determined destination by using the determined transmission power.

Furthermore, the communication terminal 100 according to this exemplary embodiment determines a transmission power having a sufficiently small effect on communication already being executed and selects a transmitted signal destination from among the terminals in the wireless communication area. Accordingly, the communication terminal 100 is capable of ascertaining a transmission power and a transmitted signal destination in the wireless communication area which have a sufficiently small effect on communication already being executed.

When the communication terminal 100 according to this exemplary embodiment is used, a plurality of sets of terminals is capable of executing communication in parallel within the wireless communication area. Because a plurality of sets of terminals is capable of executing communication in parallel within the wireless communication area, the usage efficiency of wireless radio waves in the space is improved. In other words, the communication capacity in the space increases. The communication capacity in the space increases particularly in a case where usage of a communication terminal for which a DCF scheme is adopted is combined with the communication terminal 100 according to this exemplary embodiment.

Moreover, the communication terminal 100 according to this exemplary embodiment advertises, to other terminals within the wireless communication area, the signal strength upon receipt of a signal from a terminal which is scheduled to become a communication partner. When the signal strength is advertised, the other terminals within the wireless communication area are capable of ascertaining the signal strength, on the receiving side receiving the signal, of communication already being executed.

The other terminals within the wireless communication area are capable of determining, on the basis of the ascertained signal strength, a transmission power and a transmitted signal destination which have a sufficiently small effect on communication already being executed. In other words, a plurality of sets of terminals is capable of executing communication in parallel within the wireless communication area.

A decentralized carrier sensing communication scheme (DCF communication scheme) in which each terminal observes the state of communication in the surrounding environment and the terminals themselves transmit a signal when communication is not being executed is adopted for the wireless communication system according to this exemplary embodiment. Furthermore, data transfers over a wireless mesh network are also realized by the wireless communication system according to this exemplary embodiment.

Note that the communication terminal 100 according to this exemplary embodiment may also be realized by a processor such as a central processing unit (CPU) that executes processing according to a program which is stored on a non-transitory storage medium, for example. That is, the app processing unit 110, transmission/reception control unit 120, simultaneous transmission destination determination unit 130, radio interference management unit 150, and wireless communication control unit 160 may also be realized by a CPU that executes processing according to program control, for example.

The received signal list storage unit 140 may also be realized by a random-access memory (RAM), for example.

The respective parts of the communication terminal 100 according to this exemplary embodiment may also be realized by hardware circuitry. By way of an example, the app processing unit 110, transmission/reception control unit 120, simultaneous transmission destination determination unit 130, received signal list storage unit 140, radio interference management unit 150, and wireless communication control unit 160 may each be realized by large-scale integration (LSI). These parts may also be realized by one LSI.

Figure 10:
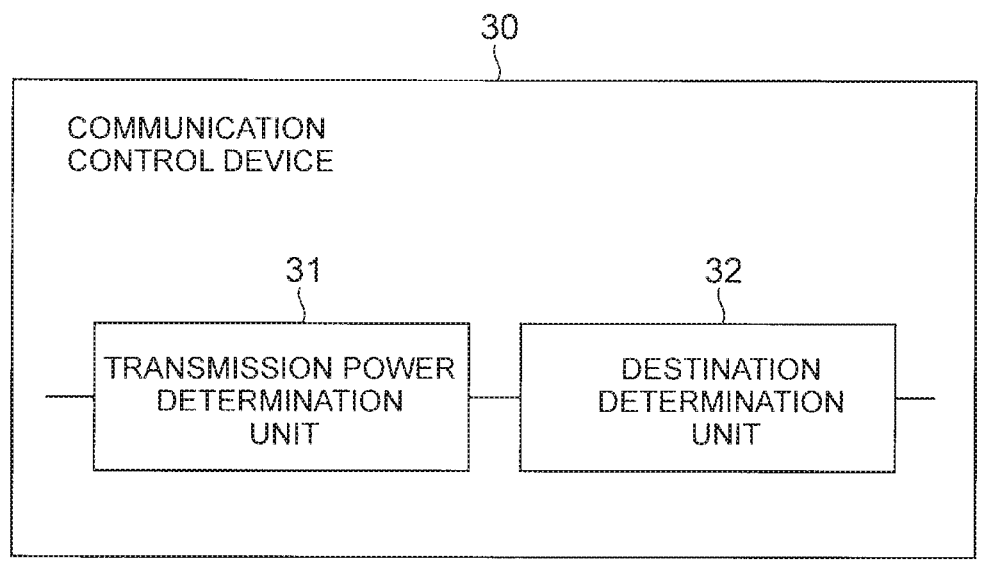
FIG. 10 is a block diagram providing an overview of a communication control device of the present invention.
Figure 11:
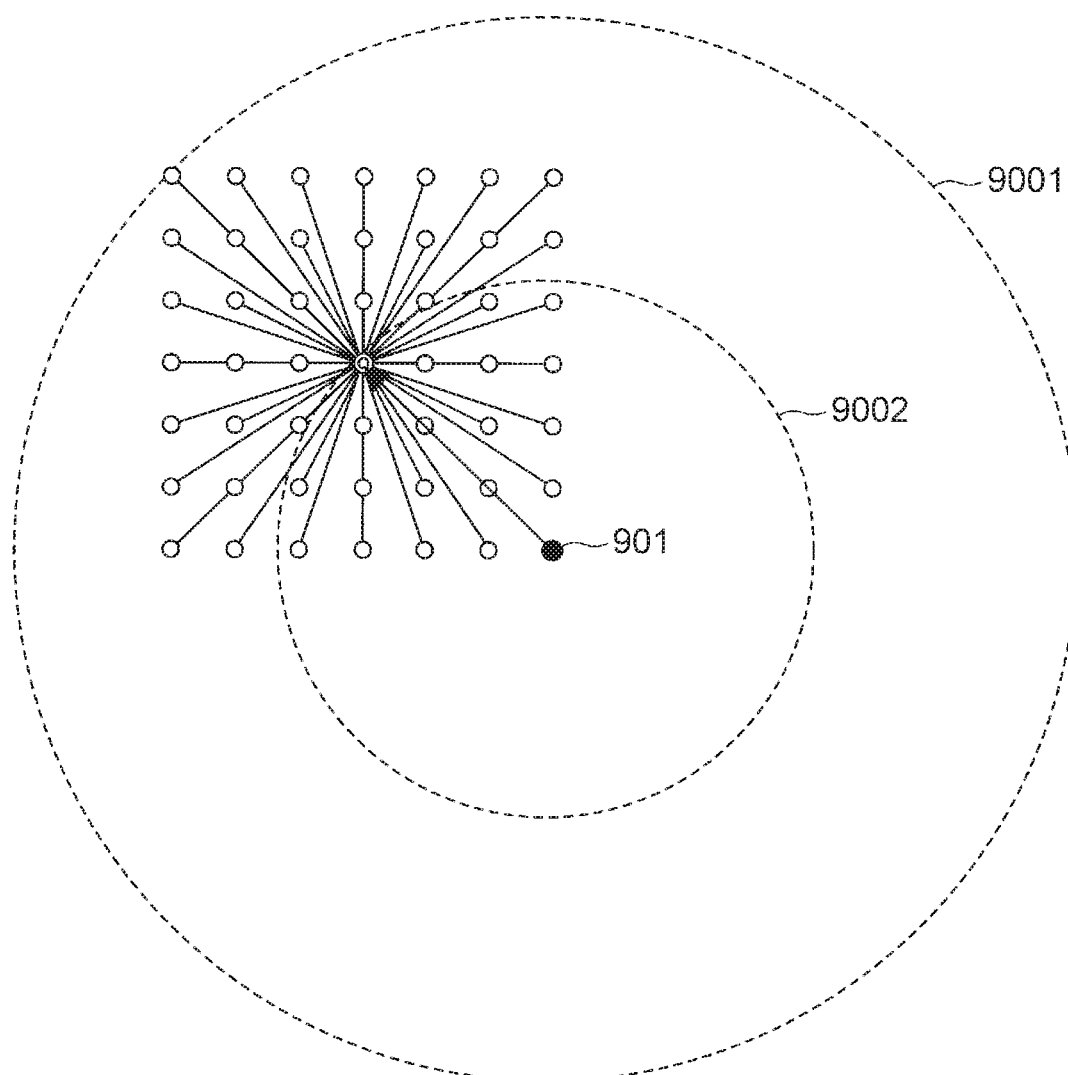
FIG. 11 is an explanatory diagram showing an example of a signal range in wireless communication for which a general DCF scheme is adopted.

An overview of the present invention will be provided next. FIG. 10 is a block diagram providing an overview of a communication control device of the present invention. The communication control device 30 of the present invention is a communication control device that determines second communication processing that is communication processing that can be executed in parallel with first communication processing that is communication processing that is executed between a transmission terminal and a reception terminal, the communication control device including: a transmission power determination unit 31 (for example, the simultaneous transmission destination determination unit 130) that determines conditions for the transmission power of a signal that would not impede the first communication processing, even if a signal that is transmitted by means of the second communication processing is received by the reception terminal; and a destination determination unit 32 (for example, the simultaneous transmission destination determination unit 130) that determines a destination for the second communication processing from among terminals at which a signal that is transmitted at transmission power that satisfies the determined conditions could arrive.

As a result of this configuration, the communication control device is capable of executing wireless communication in parallel with wireless communication already being executed in the wireless communication area and without disrupting the wireless communication being executed.

Furthermore, the transmission power condition may be that a signal strength, at the reception terminal of the first communication processing, of the signal transmitted by means of the second communication processing is less than a signal strength, at the reception terminal, of a signal transmitted by means of the first communication processing by at least a predetermined percentage.

As a result of this configuration, the communication control device is capable of transmitting a signal using a transmission power in which the signal strength upon receipt by the reception terminal is sufficiently small.

In addition, the transmission power determination unit 31 may determine the transmission power condition by using data which is transferred from the reception terminal of the first communication processing and indicates the signal strength, at the reception terminal, of the signal transmitted by means of the first communication processing.

As a result of this configuration, the communication control device is capable of determining the transmission power by using a CTS which is advertised by the access point.

Furthermore, the transmission power determination unit 31 may determine a transmission power condition by using a signal that is transmitted by means of the first communication processing by the transmission terminal of the first communication processing.

As a result of this configuration, the communication control device is capable of determining the transmission power without using a CTS.

Furthermore, the communication control device 30 may include a control unit (for example, the transmission/reception control unit 120) for controlling the second communication processing, and the control unit may estimate a scheduled end time of the first communication processing and execute second communication processing such that the second communication processing ends no later than the estimated scheduled end time.

As a result of this configuration, the communication control device is capable of executing wireless communication such that there is no observable difference from the outside from wireless communication for which a DCF scheme is adopted.

Furthermore, the control unit may estimate a scheduled end time of the first communication processing by using data which is transferred from the reception terminal of the first communication processing and indicates a scheduled execution time of the first communication processing.

As a result of this configuration, the communication control device is capable of shortening the time taken to estimate the scheduled end time of the first communication processing.

Furthermore, the transmission terminal of the first communication processing may store, in a communication frame, the transmission power upon transmission of the signal. The reception terminal of the first communication processing, which receives the communication frame, may estimate the amount of radio attenuation in the communication area.

Although the present invention has been described hereinabove with reference to an exemplary embodiment and embodiment examples, the present invention is not limited to the foregoing exemplary embodiment and embodiment examples. The configuration and details of the present invention may be modified within the scope of the present invention in various ways that would be comprehensible to a person skilled in the art.

The present application claims a right of priority on the basis of Japanese Patent Application No. 2017-180925 published on Sep. 21, 2017, the entire disclosure of which are incorporated by reference in the present specification.

REFERENCE SIGNS LIST 10, 20 Wireless communication system
30 Communication control device
31 Transmission power determination unit
32 Destination determination unit
A, B, C, X, Y, Z, 100, 202, 203, 204, 205, 206, 213, 901 Communication terminal
110 Application processing unit
120 Transmission/reception control unit
130 Simultaneous transmission destination determination unit
140 Received signal list storage unit
150 Radio interference management unit
160 Wireless communication control unit
201, 902 Access point
1001, 1002, 1003, 2001, 2002, 2003, 9001, 9002 Range

What is claimed is:

1. A communication control method executed in a communication control device determining second communication processing that is communication processing capable of being executed in parallel with first communication processing that is communication processing executed between a first transmission terminal using a first transmission power of a first signal and a first reception terminal, the communication control method comprising:

determining a transmission power condition for a second transmission power of a second signal, wherein the second transmission power would not impede reception of the first signal at the first reception terminal, even if the second signal that is transmitted by means of the second communication processing is received by the first reception terminal; and determining a second reception terminal as a destination for an arrival of the second signal, wherein the second signal is transmitted at the second transmission power that satisfies the determined conditions including the second signal not impeding a reception of the first signal at the first reception terminal.

2. The communication control method according to claim 1, wherein the transmission power condition is that a second received signal strength, at the first reception terminal, of the second signal is less than a first received signal strength, at the first reception terminal, of the first signal by at least a predetermined percentage.

3. The communication control method according to claim 2, wherein the transmission power condition is determined by using data which is transferred from the first reception terminal, and the data is configured to indicate the first received signal strength, at the first reception terminal, of the first signal transmitted by the first transmission terminal.

4. The communication control method according to claim 3, further comprising:

estimating a scheduled end time of the first communication processing, and executing the second communication processing such that the second communication processing ends no later than the estimated scheduled end time.

5. The communication control method according to claim 2, wherein the determining the transmission power condition further comprises determining the transmission power condition by the first transmission terminal using the first signal.

6. The communication control method according to claim 5, further comprising:

estimating a scheduled end time of the first communication processing, and executing the second communication processing such that the second communication processing ends no later than the estimated scheduled end time.

7. The communication control method according to claim 2, further comprising:

estimating a scheduled end time of the first communication processing, and executing the second communication processing such that the second communication processing ends no later than the estimated scheduled end time.

8. The communication control method according to claim 7, wherein the estimating the scheduled end time comprises using data, wherein the data is transferred from the reception terminal of the first communication processing, and the data is configured to indicate a scheduled execution time of the first communication processing.

9. The communication control method according to claim 1,
wherein the transmission power condition is determined by using data which is transferred from the first reception terminal, and the data is configured to indicate the first received signal strength, at the first reception terminal, of the first signal transmitted by the first transmission terminal.

10. The communication control method according to claim 9, further comprising:
estimating a scheduled end time of the first communication processing, and
executing the second communication processing such that the second communication processing ends no later than the estimated scheduled end time.

11. The communication control method according to claim 10, wherein the estimating the scheduled end time comprises using data, wherein the data is transferred from the reception terminal of the first communication processing, and the data is configured to indicate a scheduled execution time of the first communication processing.

12. The communication control method according to claim 1,
wherein the determining the transmission power condition further comprises determining the transmission power condition by the first transmission terminal using the first signal.

13. The communication control method according to claim 12, further comprising:
estimating a scheduled end time of the first communication processing, and
executing the second communication processing such that the second communication processing ends no later than the estimated scheduled end time.

14. The communication control method according to claim 13, wherein the estimating the scheduled end time comprises using data, wherein the data is transferred from the reception terminal of the first communication processing, and the data is configured to indicate a scheduled execution time of the first communication processing.

15. The communication control method according to claim 1, further comprising:
estimating a scheduled end time of the first communication processing, and
executing the second communication processing such that the second communication processing ends no later than the estimated scheduled end time.

16. The communication control method according to claim 15, wherein the estimating the scheduled end time comprises using data, wherein the data is transferred from the reception terminal of the first communication processing, and the data is configured to indicate a scheduled execution time of the first communication processing.

17. A communication control device determining second communication processing that is communication processing capable of being executed in parallel with first communication processing that is communication processing executed between a first transmission terminal using a first transmission power of a first signal and a first reception terminal, the communication control device comprising:
a transmission power determination unit configured to determine conditions for a second transmission power of a second signal, wherein the second transmission power would not impede reception of the first signal at the first reception terminal, even if the second signal that is transmitted by means of the second communication processing is received by the first reception terminal; and
a destination determination unit configured to determine a second reception terminal as a destination for an arrival of the second signal, wherein the second signal is transmitted at the second transmission power that satisfies the determined conditions including the second signal not impeding a reception of the first signal at the first reception terminal.

18. The communication control device according to claim 17,
wherein the transmission power condition is that a second received signal strength, at the first reception terminal, of the second signal is less than a first received signal strength, at the first reception terminal, of the first signal by at least a predetermined percentage.

19. A non-transitory computer-readable recording medium on which a communication control program is recorded,
the communication control program comprising: when executed by a computer determining second communication processing that is communication processing capable of being executed in parallel with first communication processing that is communication processing executed between a first transmission terminal using a first transmission power of a first signal and a first reception terminal, the communication control method comprising:
determining conditions for a second transmission power of a second signal, wherein the second transmission power would not impede reception of the first signal at the first reception terminal, even if the second signal that is transmitted by means of the second communication processing is received by the first reception terminal; and
determining a second reception terminal as a destination for an arrival of the second signal, wherein the second signal is transmitted at the second transmission power that satisfies the determined conditions including the second signal not impeding a reception of the first signal at the first reception terminal.

20. The recording medium according to claim 19,
wherein the transmission power condition is that a second received signal strength, at the first reception terminal, of the second signal is less than a first received signal strength, at the first reception terminal, of the first signal by at least a predetermined percentage.

* * * * *